United States Patent [19]

Groothuis

[11] Patent Number: 4,751,811
[45] Date of Patent: Jun. 21, 1988

[54] CONVEYOR FOR A COMBINE HARVESTER
[75] Inventor: Irvan A. Groothuis, Lincoln, Nebr.
[73] Assignee: The Goodyear Tire & Rubber Company, Akron, Ohio
[21] Appl. No.: 839,405
[22] Filed: Mar. 14, 1986
[51] Int. Cl.⁴ .................. A01D 43/02; A01D 89/00
[52] U.S. Cl. ...................... 56/364; 56/400; 198/698
[58] Field of Search .............. 56/364, 400, 400.21; 198/698, 699, 699.1, 692, 693

[56] References Cited

U.S. PATENT DOCUMENTS

| | | | |
|---|---|---|---|
| 2,875,887 | 3/1959 | Hinchcliffe | 198/699 |
| 4,437,296 | 3/1984 | Erdman | 56/400 |
| 4,495,755 | 1/1985 | Johnson | 56/364 |
| 4,545,188 | 10/1985 | Klinner | 56/364 |

FOREIGN PATENT DOCUMENTS 676336 12/1963 Canada .......................... 56/400

Primary Examiner—Stephen J. Novosad
Assistant Examiner—Matthew Smith
Attorney, Agent, or Firm—R. D. Thompson

[57] ABSTRACT

This invention relates to a flexible endless conveyor for a harvester pickup apron made up of a number of side-by-side rubber belts. Each belt has an integrally molded series of main cleat attachments for rigid tines. Each tine is set astride a central cleat while the leading and trailing edges of the tines are held by undercuts in a pair of subcleats which are perpendicular to each main cleat. The subcleats prevent any debris from lodging under the body of the tine during crop harvesting.

11 Claims, 4 Drawing Sheets

CONVEYOR FOR A COMBINE HARVESTER

BACKGROUND OF THE INVENTION

This invention generally relates to combine harvesters and more particularly to an improved flexible belt conveyor for a pickup apron as may be used on combines or window-type farm machinery such as grain harvesters and balers.

BACKGROUND ART

There are many known configurations of draper pickup apron in the prior art and for each of these known configurations there are numerous arrangements of apparatus for attaching the crop gathering tines that are mounted on the pickup apron for the purpose of carrying the crop to the combine auger for separating the grain, baling and/or other processing. Most of these prior art conveyor configurations suffer from having a multiplicity of parts such as plates, brackets, rivets, fasteners that are used to fasten the tines to the flexible apron. The breakage or loss of any of the multiplicity of such parts during the limited harvesting period is very costly. The down time incurred during harvesting is especially critical because of the limited time in which the harvest of the particular crop must be completed. The complex configurations involving multiple parts suffer from the operational problem during harvesting of grain stocks, weeds and vines becoming entangled on the multiple projections of these configurations. This debris must be manually removed. Another known configuration uses a reinforced elastomeric belt with raised cleats and holes arranged across the width of the belt through which tines are fastened. This design suffers from the operational problem of having grain stocks and other debris lodged in the multiplicity of holes in the reinforced belt. In addition, the holes in the belt lessen the integrity of the belt and the holes become stress centers during operation. The holes become the origin for stress cracking and eventual failure of the belt. Thicker belts can be utilized to overcome the problem, but this solution raises additional problems of reduced flexibility of the belt which in turn limits the minimum pulley diameters which can be used on the crop pickup assembly. In addition, the method of manufacture of this belt is expensive due to the additional manufacturing step of cutting the holes in the reinforced belt carcass prior to installation of the steel tines.

Another known belt is discussed in U.S. Pat. No. 4,495,755 in which tine bodies are mounted on elastomeric cleats integral with the belt carcass. The tine bodies mounted in this way have been found to suffer from a tendency for debris to collect between the base of the tine body and the elastomeric belt. The debris enters this area when the flexible belt bends around the pulleys. The rigid tine body does not bend with the belt and thus opens up a crack in which the debris may lodge and be trapped when the belt resumes its travel after contact with the pulley. The built-up debris puts stress on the attachment pin through the elastomeric cleat and can in extreme cases cause cleat shearing and potential loss of the tine.

In view of these and other problems associated with the present draper-type aprons for combine harvesters and balers, this invention provides the following objects, features and advantages: a flexible belt with fastening means which envelopes the base of each cleat to prevent entry of debris between the tine base and belt surface; a flexible belt conveyor that eliminates a multiplicity of fasteners and provides a simple mechanism for attaching and detaching crop gathering tines; a pickup belt for a combine harvester or baler that offers easy removal of broken or lost tines; a pickup apron which resists the accumulation of debris during crop gathering operations.

These and other advantages are accomplished in a flexible endless conveyor for a harvester pickup apron resistant to an accumulation of debris comprising in combination: at least one elastomeric belt having a longitudinal direction of travel and a transverse direction and elastomeric base with a plurality of integrally molded elastomeric cleats raised from the base and oriented in a plurality of transverse rows across the belt with transversely adjacent cleats interrupted by a space exceeding one-half the transverse dimension of said cleats, each of said cleats having a cleat bore therethrough with an axis parallel to the base, said cleat bores being aligned substantially perpendicular to the longitudinal direction of the belt, each of said cleats having a leading edge and a trailing edge defined by said longitudinal direction of travel of said belt longitudinally spaced, each cleat having a corresponding pair of integral protective subcleats positioned parallel to and spaced longitudinally away from the leading and trailing edges of said cleat, said subcleats having a radiused undercut oriented toward said cleat; a plurality of tine bodies mounted on said belt, each tine body having a tine mounting bore therethrough with an axis substantially parallel to the base of the belt such that the tine mounting bore substantially aligns with said cleat bore when said tine bodies are mounted on said belt, each tine body including a smoothly radiused leading portion and a smoothly radiused trailing edge portion, complementary in shape to said radiused undercut of said subcleat and each tine body having a cleat aperture therein substantially equal in dimension to the dimension of said cleats and said tine bodies having at least one flexible tine extending therefrom; and intersecting the tine mounting bore, each of said tine bodies being mounted on said belt by fitment of said cleat into said cleat aperture and positioning said radiused leading portion and said trailing radiused portion of said tine body into said radiused undercut of said pair of protective subcleats; and a means for detachably attaching said tine bodies to said belt through said tine mounting bore and at least one of said cleat bores.

BRIEF DESCRIPTION OF THE DRAWINGS

The features and advantages of the invention will be better understood from a consideration of the following description when taken in conjunction with the accompanying drawings in which.

DETAILED DESCRIPTION OF THE INVENTION

Figure 1:
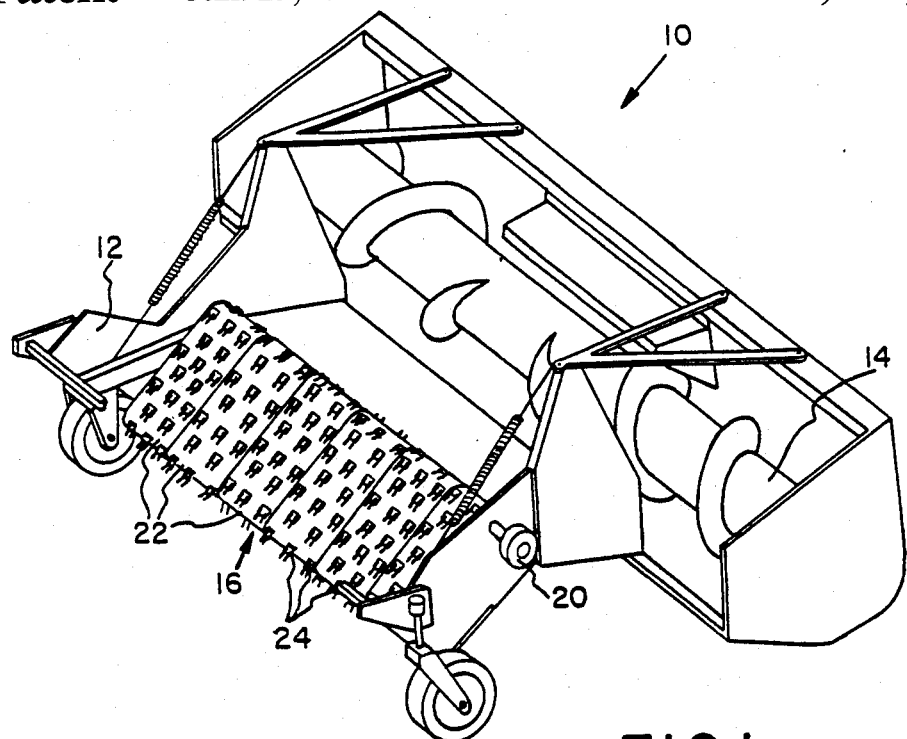
FIG. 1 is a perspective view of the forward end of a harvester platform on which is mounted a draper pickup conveyor embodying the instant invention.

FIG. 1 shows the forward end of a combine harvester generally indicated by reference numeral 10 which includes a crop pickup assembly 12 for gathering crops and feeding them into the area of a conventional harvester auger 14. The pickup assembly 12 includes a flexible conveyor generally indicated by numeral 16 that is driven by suitable drive means 20. The flexible conveyor is positioned and supported by suitable means, such as a pulley system illustrated in FIG. 5. The conveyor 16 comprises at least one and preferably a series of side-by-side mounted flexible belts 22 which carry a plurality of crop gathering tines 24 on the surface and which effect pickup of the crop as the belts rotate and the harvester moves in a forward direction. Draper pickup attachments for combine harvesters of the type described are manufactured by the Melroe Division of the Clark Equipment Company, Gwinner, N. Dak.

Figure 2:
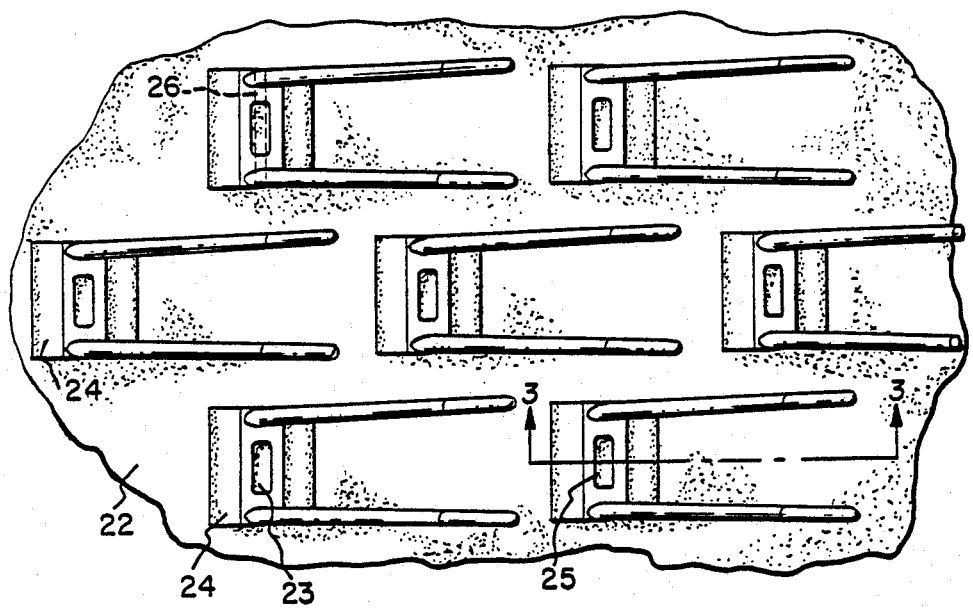
FIG. 2 is a plan view of one of the belts comprising the conveyor showing several crop gathering tines mounted on the belt.

FIG. 2 shows a section of one of the elastomeric belts 22 which are used in side-by-side combination to form a conveyor. The belt 22 has a longitudinal direction and a transverse direction. Preferably the belt 22 may be made and vulcanized in an endless loop by well known and recognized methods in the belt art. Alternatively each belt may be formed in sections with said sections being coupled together by means such as wire lacing, hooks or staples to form a continuous loop for use on the draper pickup assembly 12 of FIG. 1. Each belt 22 has a plurality of integrally molded elastomeric cleats 23 which rise from the surface of the belt and are oriented in a plurality of rows across the width of the belt as shown in FIG. 1 with adjacent cleats 23 interrupted by a space which exceeds one-half the transverse dimension of the molded elastomeric cleats. The number of cleats will depend upon the final width of the belt as well as the type of crop which will be gathered by the harvester. Each cleat 23 has mounted thereon a tine body generally indicated by reference numeral 24. Each tine body 24 has an aperture 25 which is substantially equal to the dimensions of the cleat 23 which fits within the aperture 25. The aperture 25 may extend completely through the tine body 24 or it may be a cavity of appropriate dimension within the tine body.

Figure 3:
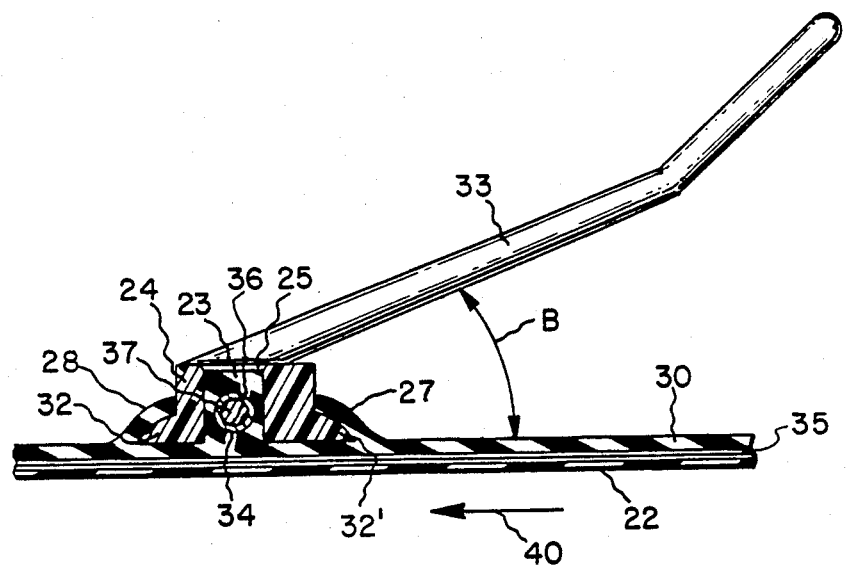
FIG. 3 is a cross-sectional view of a portion of the belt of FIG. 2 taken along line 3—3.
Figure 4:
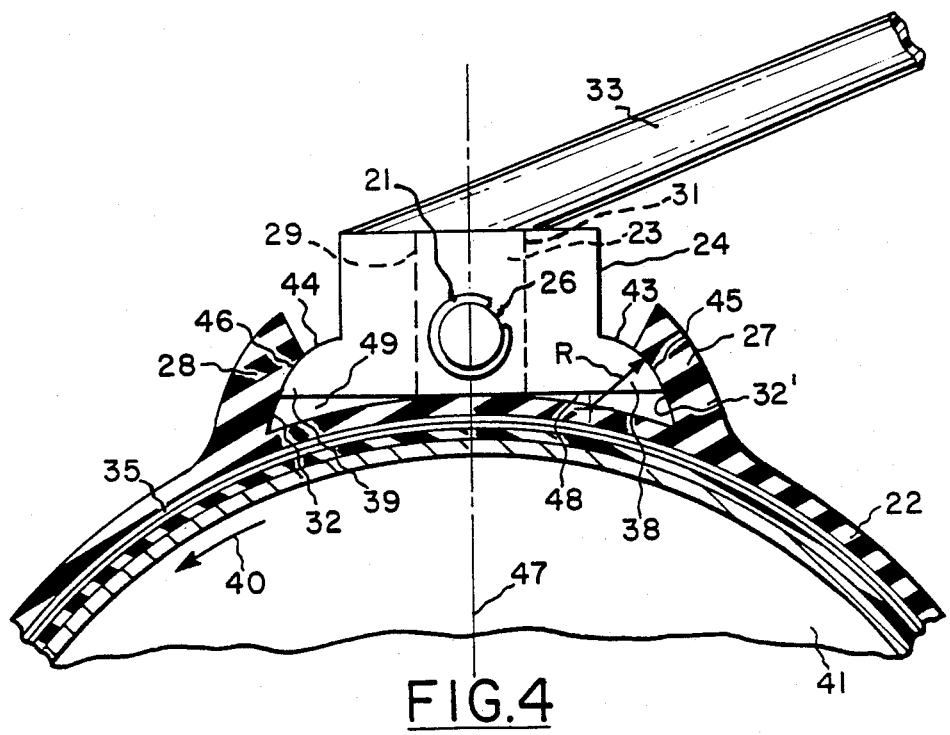
FIG. 4. is an enlarged side elevational view of the belt portion shown in FIG. 3 illustrating the action of the belt/tine combination as the belt traverses a pulley while mounted in the harvester platform of FIG. 1.

FIG. 3 provides further cross-sectional detail of the structure of the elastomeric belt and the tine body. FIG. 4 shows the belt and tine passing over a pulley. The following discussion relates to both FIG. 3 and FIG. 4. The elastomeric belt 22 is composed of a base 30 composed of an elastomeric matrix material. The base 30 is of integral, unitary construction having a uniform cross-section with no holes or openings in it. The base 30 preferably contains one or more reinforcement layers 35 embedded therein for added strength. The cleats 23 are integrally molded as a part of the base 30 and are fully coextensive therewith. Each cleat 23 has an associated pair of elastomer subcleats 27,28 which are positioned perpendicular to the leading edge 29 and trailing edge 31 of the cleat 23. The subcleats 27,28 are spaced longitudinally apart from the cleat 23. It is to be understood that the leading edge 29 and trailing edge 31 have reference to the longitudinal direction of travel indicated by the arrow 40 in FIGS. 3, 4 and 5. The subcleats 27 and 28 include radiused undercuts 32,32'. FIGS. 3 and 4 show the preferred form of undercut 32,32' as a concave quarter circle viewed in longitudinal cross section which opens toward the cleat 23. It is understood that the shape of the undercut 32,32' may be any smooth concave radiused profile. The requirement that it have a smoothly radiused surface derives from the complementary shape of the tine body which fits into this undercut which must allow the tine body 24 to slide smoothly within the undercut 32,32' during flexing of the belt as discussed below. The selection of elastomeric materials and reinforcement layers are within the skill of persons knowledgeable in the belt making art. Reinforcing fabrics made from nylon, polyester, rayon are exemplary types used in such belts. Synthetic rubbers and natural rubber are commonly used elastomers for the elastomeric matrix and cleats. Thermoplastic polymers having flexibility suitable for the application may be used as well. Illustrative of such materials are ethylene-propylene copolymers mixed with polypropylene, polyvinylchloride, nylon, etc. FIG. 3 illustrates a bore extending through cleat 23 having an axis parallel to the base of the belt 22. The bores 34 through each cleat 23 in the plurality of rows are aligned substantially perpendicular to the longitudinal direction of the belt 22. The cleat bore 34 is shown in FIG. 3 to have a circular cross-section although any geometrical shape including triangular, square or rectangular may be utilized for this bore 34. The positioning of the bore may be centered in the cleat or the bore may be adjacent to an edge of the cleat. For example, the cross-sectional bore form may be a semi-circle open on the vertical face of the cleat 23 such as to form a longitudinal groove in the cleat parallel to the base.

The tine body generally indicated by the reference numeral 24 includes a smoothly radiused leading edge portion 38 and a radiused trailing edge portion 39 each of which have a radius of curvature R which forms an upper surface 43,44 which is complementary to the radiused undercut 32,32' of the subcleats 27 and 28. The radius R and its center point is determined with respect to the pulley diameter, the pitch line of the belt, and the length of the tine base from the point of attachment to the belt to the trailing edge of the tine body. The length of the upper surface 43,44 is necessarily less than the curvilinear length 45,46 of the undercuts 32,32'. This length relationship of the undercuts and leading and trailing edge portions of the tine allows the tine body to pivot about the axis 47 of the tine body 24 during the travel over the pulleys 41,42,43 shown in FIG. 5.

Careful comparison of the spatial relationship of the tine body 24 to the subcleats 27,28 in FIG. 3 and FIG. 4 clearly shows the critical complementary geometry of the undercut 32,32' and the leading and trailing edge portions 38,39. In FIG. 3 the belt is traveling between pulleys such that the belt 22 is parallel to the base 48 of the tine 24. In FIG. 4 the belt 22 is traveling around the pulley 41. The upper surface 43 of the leading edge portion 38 of the tine 24 pivots and slides partially out of contact with the surface 45 of the undercut 32. The trailing edge 39 undergoes similar movement. However, at all points in the travel around the pulley 41 the subcleats 27,28 protect the gaps 49 which open between the tine base 48 and the belt 22.

The tine body 24 also contains an aperture 25 which is of the same cross-sectional dimension as the cleat 23 which fits within this aperture. The aperture 25 may extend completely through the tine body 24 or it may be a cavity closed on the upper end. The tine body 24 contains a tine mounting bore 26 as shown by the hidden lines on only one tine body in FIG. 2. The cross-section of the tine mounting bore 26 may be different, but is preferably of the same geometry as the cleat bore 34, and is aligned in the tine body 24 in such a manner that when the tine body 24 is placed over the cleat 23 the cleat bore 34 and the tine mounting bore 26 are perfectly aligned to form a bore extending completely through the tine body and cleat in the transverse direction of the belt. The tine body 24 includes at least one tine 33 extending therefrom at an approximate angle $\beta$ of between 15° to 55° where $\beta$ is measured between the tine 33 and the base 30 of the elastomeric belt 22. Design preference may indicate that the tine 33 may contain other angular configurations as may be determined by one skilled in the art.

The tine bodies 24 are detachably mounted on cleats 23 by a suitable attaching means. A rod 37, exemplary of an attachment means, is shown in FIG. 3. Rod 37 extends through the tine mounting bore and the cleat bore. Preferably the attaching means such as rod 37 may be maintained in its position by any suitable means for fastening such as a cotter pin, bolt or snap rings 21 which may be located just externally and adjacent to the tine body as shown in FIG. 4. An alternative fastening means may be a set screw which is inserted through an additional threaded bore (not shown) in the tine body which intersects the tine mounting bore 26 allowing the set screw to engage the rod 37 and thus restrict its lateral movement. Simply dimensioning the diameter of the cleat bore 34 to be less than the rod 37 will create an interference fit.

While the conveyor belt configuration herebefore described will meet the needs of most crop gathering applications there may be instances where it may be desirable to reinforce the cleat bores, FIG. 3 shows optional bushings 36 which may be vulcanized directly to the elastomer of the cleat 23. The bushings 36 would completely surround the cleat bore to provide additional support and strength to the bore. The rod 37 will then be carried in this alternate embodiment by the bushings embedded in each cleat and thus provide a stronger mounting configuration for particularly heavy duty crop gathering applications.

All tine bodies and tines described herein may be composed of suitable flexible, yet resilient materials known to be useful in the art such as heavy gauge spring steel and various thermoplastic and thermosetting polymers such as nylon, ultra high density polyethylene, polycarbonate, etc.

Figure 5:
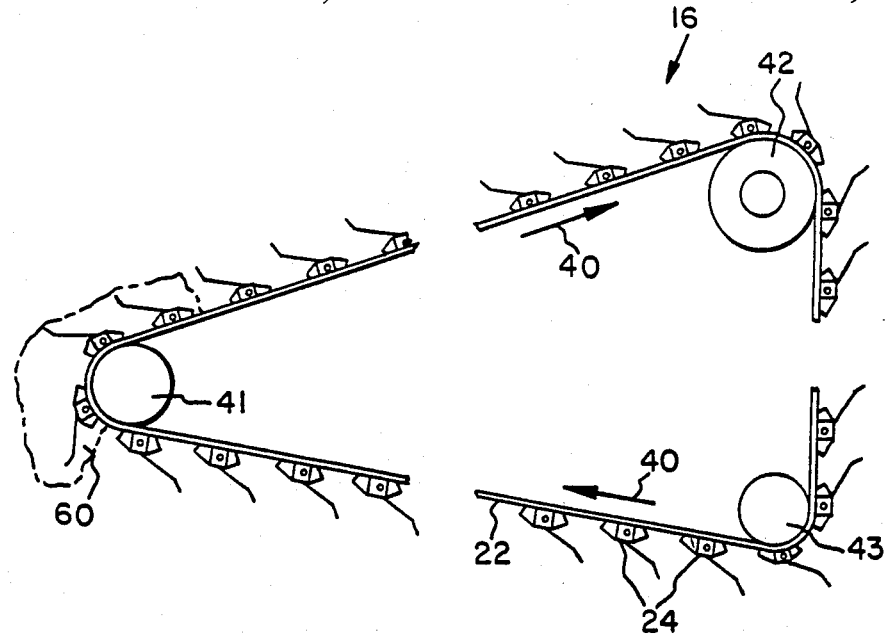
FIG. 5 is a side elevational view of the belt of the invention passing around a series of pulleys in the harvester platform of FIG. 1.

FIG. 5 illustrates the operation of the flexible endless conveyor 16 as shown in FIG. 1 during harvesting operations. The belt 22 traverses a forward pulley 41 and an upper and a lower tail pulley 42 and 43 respectively, moving in the direction of the arrow 40 toward the combine auger (not shown). The belt 22 moves in a forwardly directly indicated by arrows 40 to engage and pickup the crop 60. As clearly shown in the drawings, the tines 24 extend downwardly in a crop engaging action and have the ability to flexibly conform to the terrain or obstructions on the surface thereof. As each individual tine body 24 traverses the forward pulley 41, the crop 60 is picked up and deposited on the belt 22 for conveyance toward the upper tail pulley 42 where the crop is dropped into a conventional harvesting auger (not shown).

Figure 6:
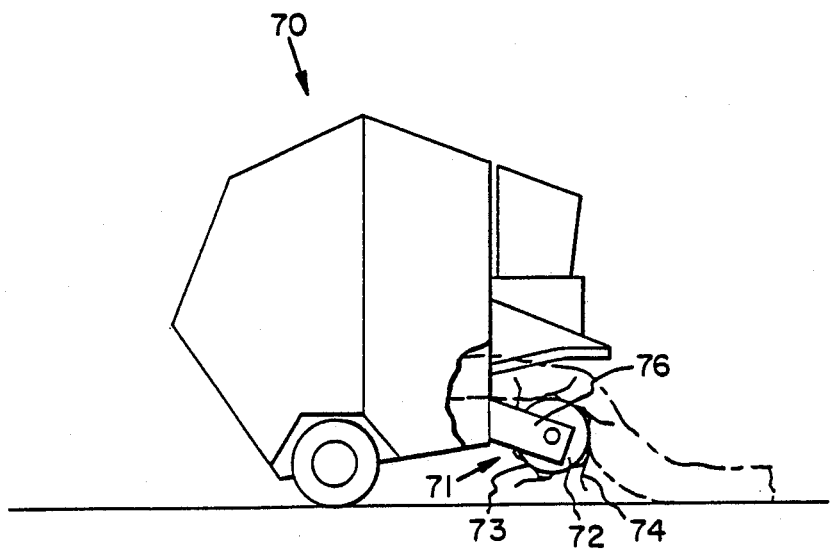
FIG. 6 is a schematic representation of a baling device using the belt of this invention.

FIG. 6 illustrates an alternative application for the belts and flexible conveyor of this invention. A hay baler 70 is shown which is operated in a field being harvested while being drawn behind a tractor (not shown). The crop pickup assembly 71 of the baler is rotatably attached to hay baler 70 and includes a frame 76 and a flexible, endless conveyor 72, showing side view, which is driven by suitable means to allow the crop gathering tine 74 to engage and pick up windrow crops 75 from the field. The flexible conveyor 72 is composed of one or more flexible belts 73 which are shown only in edge view of FIG. 6. The flexible belts 73 are similar in all respects to the belt 22 illustrated in FIGS. 2, 3 and 4. The flexible belts 73 have mounted thereon a multiplicity of crop gathering tines 74 which are similar in all respects to the tine body 24 shown in FIG. 3. While the flexible conveyor 72 is shown in FIG. 6 as being a cylindrical configuration, of course, it may be of any other suitable configuration such as the one shown in FIG. 5. The hay baler 70 may preferably produce large round bales or any other finished crop forms.

Figure 7:
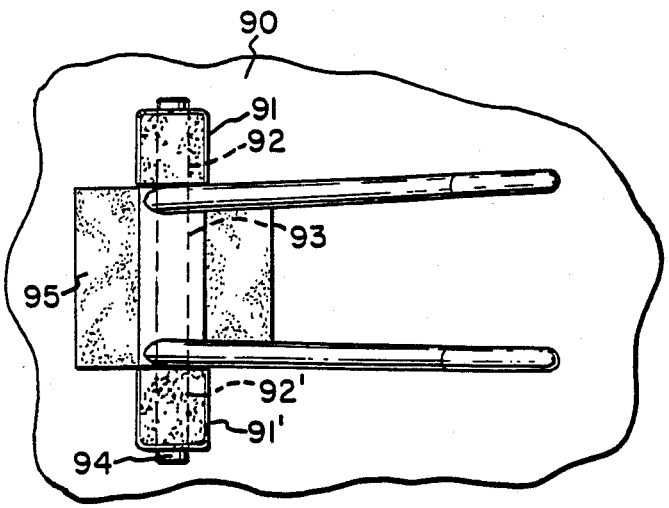
FIG. 7. is an alternative embodiment of the tine/belt combination.

FIG. 7 sets out an alternative embodiment of the invention where the tine body 95 is positioned between two transversely adjacent cleats 91 and 91' which are elastomeric and are molded integrally and coextensively with the elastomeric belt 90. The subcleats 96,97 and the tine body 95 are similar in all respects to subcleats 27,28 and tine body 24 previously described. The adjacent cleats 91 and 91' have cleat bores 92 and 92' shown as hidden lines that are similar in all respects to cleat bore 34 shown in FIG. 3. The tine body 95 contains a tine mounting bore 93 shown with hidden lines which aligns with cleat bores 92 and 92'. Any suitable means for detachably attaching tine body 95 to adjacent cleats 91 and 91' may be utilized. A mounting pin 94 is shown as a exemplary method.

Figure 8:
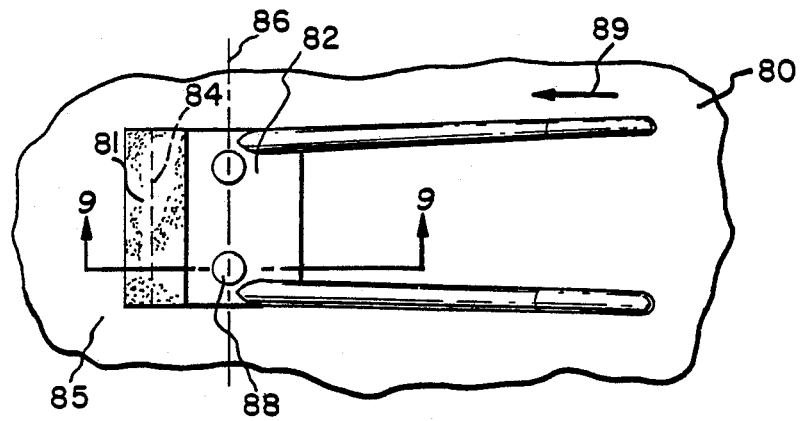
FIG. 8 is an alternative embodiment using a single protective subcleat and rivets to fasten the tine to the belt.
Figure 9:
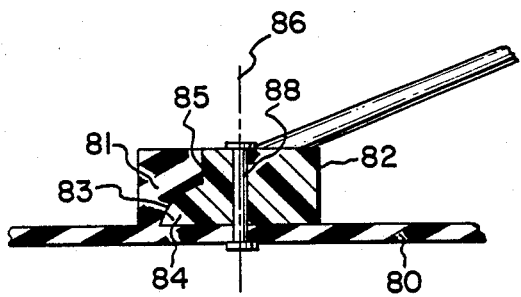
FIG. 9 is a longitudinal cross section of the embodiment of FIG. 8 taken along 9—9.

While the preferred forms of the invention are shown in FIG. 2 and FIG. 7, another useful embodiment is shown in FIG. 8 and FIG. 9. The elastomeric belt 80 has a plurality of subcleats 81 integrally molded with the belt and, oriented parallel to the belt 80 and normal to the longitudinal direction of the travel 89 belt. The rigid tine body 82 is attached to the belt 80 by one or more rivets 88 which extend perpendicularly through the belt 80 along the longitudinal median plane 86 of the tine body. This provides for facile pivoting of the rigid tine body as the belt traverses a pulley as shown in FIG. 4. The tine body pivots about the plane 86. The fastening means is a simplified alternative to the cleat and tine body aperture method of attachment shown in FIGS. 2 through 7.

The subcleat 81 includes a radiused undercut 83 which is concave relative to the belt 80. The tine body 82 includes a radiused portion 84 which is located on the leading edge 85 of the assembly. The term "leading edge" always is determined relative to the longitudinal direction of travel 89 of the belt in service. The radiused portion 84 is complementary in shape with the undercut 86 in the subcleat 81, therefore it is convex relative to the belt 80.

This embodiment provides improved protection from accumulation of debris under the tine body. A subcleat 81 is provided only on the leading edge because this is the primary point of entry in service. The riveting method of attachment of the flush mounted tine body is a simple expedient for fastening. The single subcleat on the leading edge could be advantageously used in any of the earlier described embodiments and conversely two subcleats could be used in the FIG. 8–FIG. 9 embodiment also.

While certain representative embodiments and details have been shown for the purpose of illustrating the invention it will be apparent to those skilled in the art that various changes and modifications may be made therein without departing from the scope of the invention.

What is claimed is:

1. A flexible endless conveyor for a harvester pickup apron resistant to an accumulation of debris comprising in combination:

at least one elastomeric belt having a longitudinal direction of travel and a transverse direction and elastomeric base with a plurality of integrally molded elastomeric cleats raised from the base and oriented in a plurality of transverse rows across the belt with transversely adjacent cleats interrupted by a space exceeding one-half the transverse dimension of said cleats, each of said cleats having a cleat bore therethrough with an axis parallel to the base, said cleat bores being aligned substantially perpendicular to the longitudinal direction of the belt, each of said cleats having a leading edge and a trailing edge defined by said longitudinal direction of travel of said belt longitudinally spaced, each cleat being flanked by a corresponding pair of integral protective subcleats positioned parallel to and spaced longitudinally away from the leading and trailing edges of said cleat, said subcleats having a radiused undercut oriented toward said cleat;

a plurality of tine bodies mounted on said belt, each tine body having a tine mounting bore therethrough with an axis substantially parallel to the base of the belt such that the tine mounting bore substantially aligns with said cleat bore when said tine bodies are mounted on said belt, each tine body including a smoothly radiused leading portion and a smoothly radiused trailing edge portion, complementary in shape to said radiused undercut of said subcleat and each tine body having a cleat aperture therein substantially complementary in shape to said cleats and said tine bodies having at least one flexible tine extending therefrom, the tine mounting bore of each tine body intersecting said cleat aperture, each of said tine bodies being mounted on said belt by fitment of said cleat into said cleat aperture and positioning said radiused leading portion and said trailing radiused portion of said tine body into said radiused undercut of said pair of protective subcleats; and a means for detachably attaching said tine bodies to said belt through said tine mounting bore and said cleat bore.

2. A flexible endless conveyor as set forth in claim 1 wherein said radiused undercut of said subcleat is in the form of a concave quarter circle when viewed in longitudinal cross section of the belt and wherein said leading and trailing edge portions of said tine body have a complementary convex quarter circle shape said convex quarter circle shape fits into said undercut to prevent accumulation of debris between said tine body and said belt.

3. A flexible endless conveyor as set forth in claim 1 wherein said molded elastomeric cleat is of rectangular shape with the largest dimension of the rectangle being in the transverse direction of the belt.

4. A flexible endless conveyor as set forth in claim 1 wherein each tine body is detachably attached to a single cleat by a rod which extends through the tine mounting bore and the cleat bore.

5. A flexible endless conveyor as set forth in claim 5 further comprising in combination a means for preventing transverse movement of said rod within said cleat bore and tine mounting bore.

6. A flexible endless conveyor as set forth in claim 1 wherein the elastomeric base of the belt has embedded therein at least one reinforcement layer.

7. A flexible endless conveyor as set forth in claim 1 further comprising a bushing molded into each cleat, said bore extending through said bushing.

8. A flexible endless conveyor for a harvester pickup apron resistant to accumulation of debris comprising in combination:

at least one elastomeric belt having a longitudinal direction of travel, an elastomeric base, a plurality of longitudinally spaced apart, integrally molded elastomeric subcleats raised from said elastomeric base and oriented parallel to said elastomeric base and normal to said longitudinal direction of travel; each of said molded elastomeric subcleats including a radiused undercut adjacent said elastomeric base, normal to the longitudinal direction of travel and open in a direction diametrically opposite to said longitudinal direction of travel of said belt;

a plurality of rigid tine bodies positioned on said elastomeric base of said belt, each of said rigid tine bodies being associated with one of said molded elastomeric subcleats, each of said bodies having a radiused portion complementary in shape to said radiused undercut of said elastomeric subcleat and fitting within said radiused undercut, said radiused portion of said tine body facing the longitudinal direction of travel of said belt each of said tine bodies being positioned on said belt by fitment of said radiused portion of said tine body into said radiused undercut of said subcleat and securely being attached by a means for fastening said rigid tine body to said elastomeric belt.

9. A flexible endless conveyor according to claim 8 wherein said means for fastening said rigid tine body is a plurality of fasteners extending perpendicular to said belt and normal to the longitudinal direction of travel of the belt.

10. A crop pickup system comprising, in combination:

a frame;
   a flexible endless conveyor positioned within said frame;
   a means for positioning, supporting, and driving said flexible endless conveyor within said frame, wherein said flexible endless conveyor includes,
   at least one elastomeric belt having a longitudinal direction of travel, a transverse direction and an elastomeric base with a plurality of integrally molded elastomeric cleats raised from the base and oriented in a plurality of transverse rows across the belt with transversely adjacent cleats interrupted by a space exceeding one-half the transverse dimension of said cleats, each of said cleats having a cleat bore therethrough with an axis parallel to the base, said cleat bores being aligned substantially perpendicular to the longitudinal direction of the belt, each of said cleats having a leading edge and a trailing edge defined by said longitudinal direction of travel of said belt longitudinally spaced, each cleat being flanked by a corresponding pair of integral protective subcleats positioned parallel to and spaced longitudinally away from the leading and trailing edges of said cleat, said subcleats having a radiused undercut oriented toward said cleat;

a plurality of tine bodies mounted on said belt, each tine body having a tine mounting bore therethrough with an axis substantially parallel to the base of the belt such that the tine mounting bore substantially aligns with said cleat bore when said tine bodies are mounted on said belt, each tine body including a smoothly radiused leading portion and a smoothly radiused trailing edge portion, complementary in shape to said radiused undercut of said subcleat and each tine body having a cleat aperture therein substantially complementary in shape to said cleats and said tine bodies having at least one flexible tine extending therefrom, the tine mounting bore of each tine body intersecting said cleat aperture, each of said tine bodies being mounted on said belt by fitment of said cleat into said cleat aperture and positioning said radiused leading portion and said trailing radiused portion of said tine body into said radiused undercut of said pair of protective subcleats; and a means for detachably attaching said tine bodies to said belt through said tine mounting bore and said cleat bore.

11. A crop pickup system as set forth in claim 10 wherein the means for positioning and supporting said flexible endless conveyor is a head pulley rotatably attached to said frame and at least one tail pulley rotatably attached to said frame in fixed relation to said head pulley with means for driving the flexible endless conveyor.

* * * * *